(12) United States Patent
Mitsuyasu et al.

(10) Patent No.: US 8,930,106 B2
(45) Date of Patent: Jan. 6, 2015

(54) BRAKING/DRIVING FORCE CONTROL DEVICE

(75) Inventors: Masaki Mitsuyasu, Kawasaki (JP); Katsumi Kono, Toyota (JP); Norimi Asahara, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 237 days.

(21) Appl. No.: 13/381,444

(22) PCT Filed: Jul. 9, 2009

(86) PCT No.: PCT/JP2009/003213
§ 371 (c)(1),
(2), (4) Date: Dec. 29, 2011

(87) PCT Pub. No.: WO2011/004436
PCT Pub. Date: Jan. 13, 2011

(65) Prior Publication Data
US 2012/0109481 A1    May 3, 2012

(51) Int. Cl.
| | |
|---|---|
| *G05G 1/38* | (2008.04) |
| *B60T 7/06* | (2006.01) |
| *B60K 26/02* | (2006.01) |
| *B60T 7/04* | (2006.01) |
| *B60L 11/14* | (2006.01) |
| *G05G 1/445* | (2008.04) |

(52) U.S. Cl.
CPC ............... *B60T 7/042* (2013.01); *B60L 11/14* (2013.01); *B60T 7/06* (2013.01); *G05G 1/38* (2013.01); *G05G 1/445* (2013.01); *B60L 2240/445* (2013.01); *B60L 2250/16* (2013.01); *B60L 2250/26* (2013.01); *B60T 2220/04* (2013.01); *Y02T 10/7077* (2013.01)
USPC ........................................................... 701/70

(58) Field of Classification Search
CPC ....... B60L 2250/26; B60L 11/14; B60T 7/04; B60T 7/06; B60T 2260/08; B60T 2260/09; B60T 2220/04; G05G 1/30; G05G 1/38; G05G 1/305; G05G 1/445
USPC ............................................................ 701/70
See application file for complete search history.

(56) References Cited

U.S. PATENT DOCUMENTS

| | | | | |
|---|---|---|---|---|
| 4,120,387 A | * | 10/1978 | Otteblad et al. | ............... 477/212 |
| 7,188,546 B2 | * | 3/2007 | Olofsson | ........................ 74/513 |
| 2010/0152988 A1 | * | 6/2010 | Olofsson | ........................ 701/70 |

FOREIGN PATENT DOCUMENTS

| | | |
|---|---|---|
| JP | A-64-30847 | 2/1989 |
| JP | A 1-175534 | 7/1989 |

(Continued)

OTHER PUBLICATIONS

International Search Report issued in International Application No. PCT/JP2009/003213 on Sep. 15, 2009 (with translation).

(Continued)

*Primary Examiner* — John Q Nguyen
*Assistant Examiner* — Anshul Sood
(74) *Attorney, Agent, or Firm* — Oliff PLC

(57) ABSTRACT

A braking/driving force control device includes an operating unit that executes an acceleration operation and a deceleration operation by an integral pedal, a stroke sensor that detects a stroke amount due to an operation of the operating unit, a load sensor that detects a load due to an operation of the operating unit, and a control unit that controls acceleration of a vehicle based on a stroke amount detected by the stroke sensor and further controls deceleration of a vehicle based on a load detected by the load sensor.

6 Claims, 14 Drawing Sheets

(56) References Cited

FOREIGN PATENT DOCUMENTS

| | | |
|---|---|---|
| JP | A-8-216737 | 8/1996 |
| JP | A 2001-10467 | 1/2001 |
| JP | A-2001-88587 | 4/2001 |
| JP | A-2003-261015 | 9/2003 |
| JP | A-2004-352228 | 12/2004 |
| JP | A-2006-117020 | 5/2006 |
| JP | A-2008-217331 | 9/2008 |
| JP | A 2009-37513 | 2/2009 |
| WO | WO 2009/023916 A2 | 2/2009 |

OTHER PUBLICATIONS

Translation of Nov. 13, 2012 Office Action issued in Japanese Patent Application No. 2011-521712.

* cited by examiner

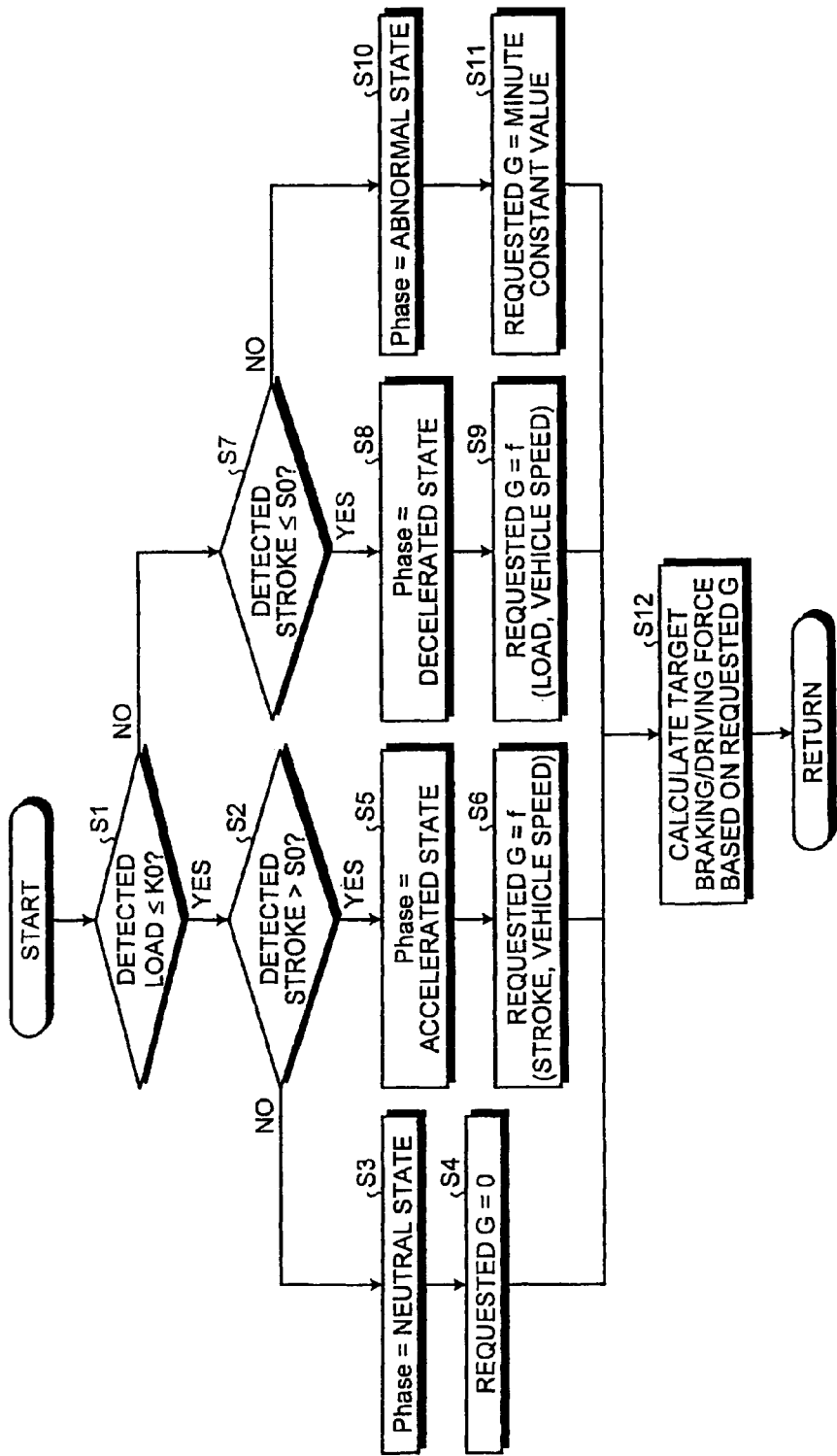

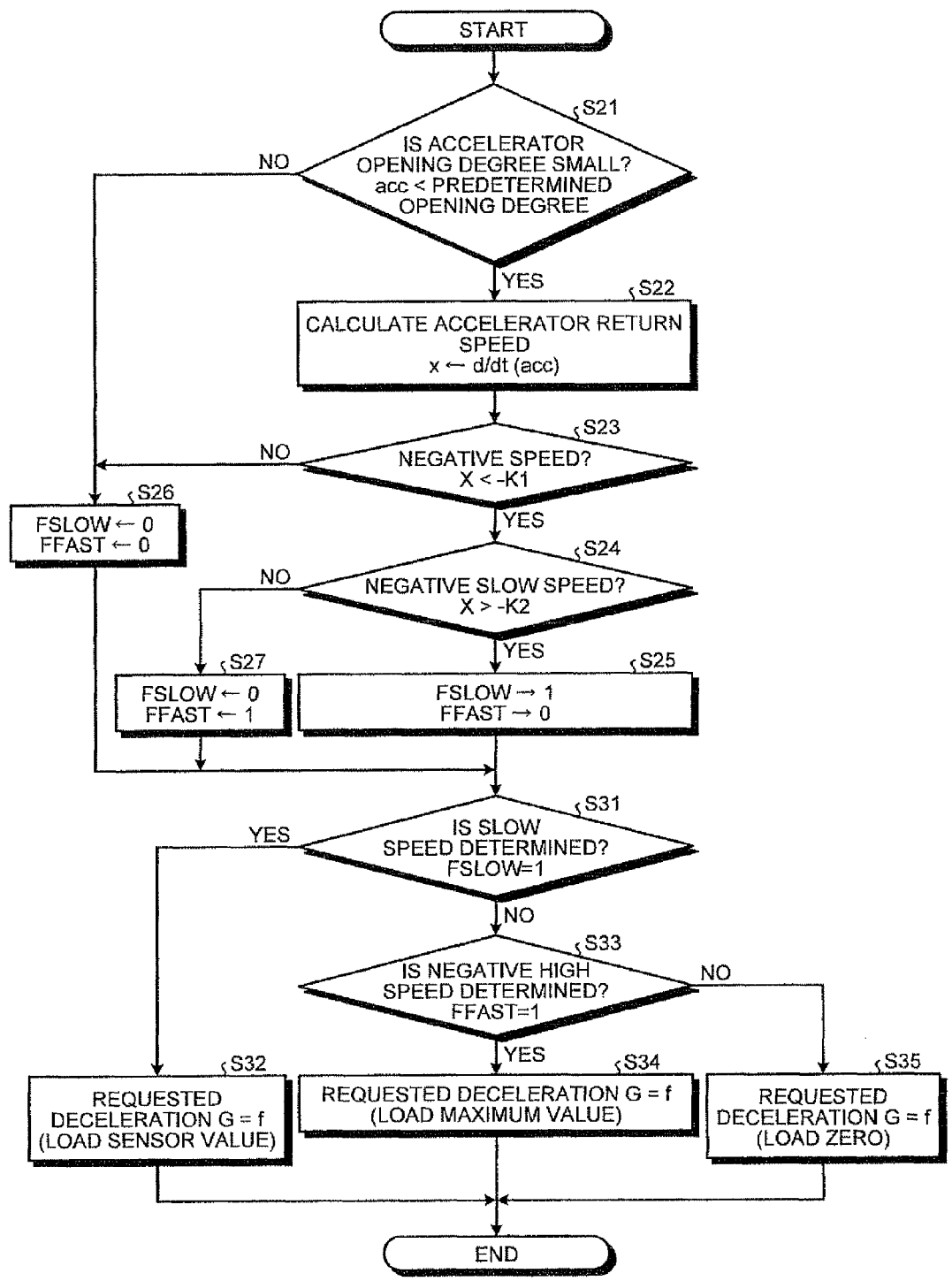

BRAKING/DRIVING FORCE CONTROL DEVICE

FIELD

The present invention relates to a braking/driving force control device and, in detail, relates to a braking/driving force control device in which a driver executes an acceleration operation and a deceleration operation by an integral pedal.

BACKGROUND

Conventional vehicles employ such a configuration that an accelerator pedal and a brake pedal are separated individually, and, in principle, an acceleration control is executed by a control of a driving force generating device by an operation of an accelerator pedal, and a deceleration control is executed by a control of a braking force generating device by an operation of a brake pedal.

Recently, to make a driving operation easily, there is proposed a technology by which a driver executes an acceleration operation and a deceleration operation by an integral pedal. For example, Patent Literature 1 discloses a technology which includes a driving force generating device capable of generating a brake load and a braking force generating device and sets a deceleration operation region, in which a braking force generated by the driving force generating device is controlled in response to a stroke, in a stroke range of an accelerator pedal.

CITATION LIST

Patent Literature

Patent Literature 1: Japanese Patent Application Laid-open No. 2001-088587.

SUMMARY

Technical Problem

However, in Patent Literature 1, since both the acceleration operation and the deceleration operation are controlled in response to a stroke of the accelerator pedal, a problem arises in that it is difficult for a driver to be aware that a shift to an acceleration region has been executed.

An object of the present invention, which was made in view of the problem, is to provide a braking/driving force control device which makes a driving operation of a driver easy as well as by which the driver can be easily aware of a boundary between an acceleration region and a deceleration region.

Solution to Problem

In order to solve the above mentioned problem and achieve the object, a braking/driving force control device according to the present invention includes an operating means that executes an acceleration operation and a deceleration operation by an integral pedal; a stroke amount detecting means that detects a stroke amount in response to an operation of the operating means; a load detecting means that detects a load in response to an operation of the operating means; and a control means that controls acceleration of a vehicle based on a stroke amount detected by the stroke amount detecting means and further controls deceleration of a vehicle based on a load detected by the load detecting means.

In addition, according to a preferable aspect of the present invention, it is desirable that the operating means is configured to be able to turn about a fulcrum as a center, the stroke amount detecting means detects a stroke amount in response to a depression operation of the operating means in one direction using a fulcrum as a center, and the load detecting means detects a load in response to a depression operation of the operating means in the other direction using a fulcrum as a center.

In addition, according to a preferable aspect of the present invention, it is desirable that the control means executes a braking/driving force control in which steady traveling is executed in an intermediate region between an acceleration operation region and a deceleration operation region of the operating means.

In addition, according to a preferable aspect of the present invention, it is desirable that the control means detects that a sensor is abnormal based on a stroke amount detected by the stroke amount detecting means and a load detected by the load detecting means.

In addition, according to a preferable aspect of the present invention, it is desirable that the operating means is configured to be able to move forward and backward, moves in a forward moving direction by a depression operation, and includes an urging means that urges the operating means in its backward moving direction and applies a reaction force in response to a depression operation of the operating means, the stroke amount detecting means detects a stroke amount in a forward moving direction in response to a depression operation of the operating means, and the load detecting means detects a load of the operating means in a backward moving direction.

In addition, according to a preferable aspect of the present invention, it is desirable to further includes a load receiving member that receives a load by being abutted against a part of the operating means, wherein the load detecting means detects a load received by the load receiving member.

In addition, according to a preferable aspect of the present invention, it is desirable that when a stroke amount of the operating means becomes equal to or less than a predetermined value, the load receiving member receives a load by being abutted with a part of the operating means.

In addition, according to a preferable aspect of the present invention, it is desirable that when the load receiving member receives a load by being abutted with a part of the operating means, gradient characteristics of the load is set to a plurality of stages with respect to a stroke amount of the operating means.

In addition, according to a preferable aspect of the present invention, it is desirable that the load receiving member is configured to be movabe and includes an urging means that urges the load receiving member in a direction opposite to a direction where a part of the operating means urges the load receiving member.

In addition, according to a preferable aspect of the present invention, it is desirable that the operating means includes a pedal plate to which a driver applies a depression force and a pedal plate receiving section, and the pedal plate is coupled with the pedal plate receiving section by an elastic member.

Advantageous Effects of Invention

According to the present invention, since there are provided the operating means that executes the acceleration operation and the deceleration operation by the integral pedal, the stroke amount detecting means that detects the stroke amount in response to the operation of the operating means, the load detecting means that detects the load in response to the operation of the operating means, and the control means that controls the acceleration of the vehicle based on the stroke amount detected by the stroke amount detecting means and further controls the deceleration of the vehicle based on the load detected by the load detecting means, a driving operation of the driver can be made easy as well as the driver can be easily aware of a boundary between an acceleration region and a deceleration region.

BRIEF DESCRIPTION OF DRAWINGS

FIG. 3-1 is a view for explaining the relation between a pedal depression force in an A direction of FIG. 2 and a stroke amount detected by a stroke sensor.

FIG. 3-2 is a view for explaining the relation between a pedal depression force in a B direction of FIG. 2 and a load detected by a load sensor.

FIG. 4 is a flowchart for explaining an operation for a vehicle ECU according to the first example to calculate a target braking/driving force in response to an operation of an operating means.

FIG. 6-1 is a view illustrating the relation between a depression force of a pedal and an accelerator stroke.

FIG. 6-2 is a view illustrating the relation between a depression force of a pedal plate and a load of a stopper.

FIG. 6-3 is a view illustrating the relation between a load of a stopper and a requested deceleration G.

FIG. 7 is a flowchart for explaining an example of an operation for a vehicle ECU according to the second example to calculate a requested deceleration G in response to an operation of a pedal plate.

FIG. 9-1 is a view illustrating the relation between a depression force of a pedal and a stroke amount S.

FIG. 9-2 is a view illustrating the relation among a stopper load, an accelerator stroke, and a pedal depression force.

FIG. 9-3 is a view illustrating a display example of an accelerator stroke and a deceleration level of a display unit.

FIG. 9-4 is a view illustrating a display example of an accelerator stroke and a deceleration level of a display unit.

FIG. 11-1 is a view illustrating the relation between a depression force of a pedal plate and a stroke amount.

FIG. 11-2 is a view illustrating the relation among a stopper load, a stroke amount, and a depression force of a pedal plate.

FIG. 13-1 is a schematic view for explaining a schematic configuration of an operating means according to a fifth example.

FIG. 13-2 is a schematic view for explaining a schematic configuration of an operating means according to the fifth example.

FIG. 13-3 is a schematic view for explaining a schematic configuration of an operating means according to the fifth example.

FIG. 13-4 is a schematic view for explaining a schematic configuration of an operating means according to the fifth example.

DESCRIPTION OF EMBODIMENT

A preferable embodiment of a braking force control device according to the present invention will be explained below in detail based on the drawings. Note that the present invention is by no means limited by the embodiment. Further, components in the embodiment include components that can be easily conceived by a person skilled in the art or substantially the same components.

Embodiment

Figure 1:
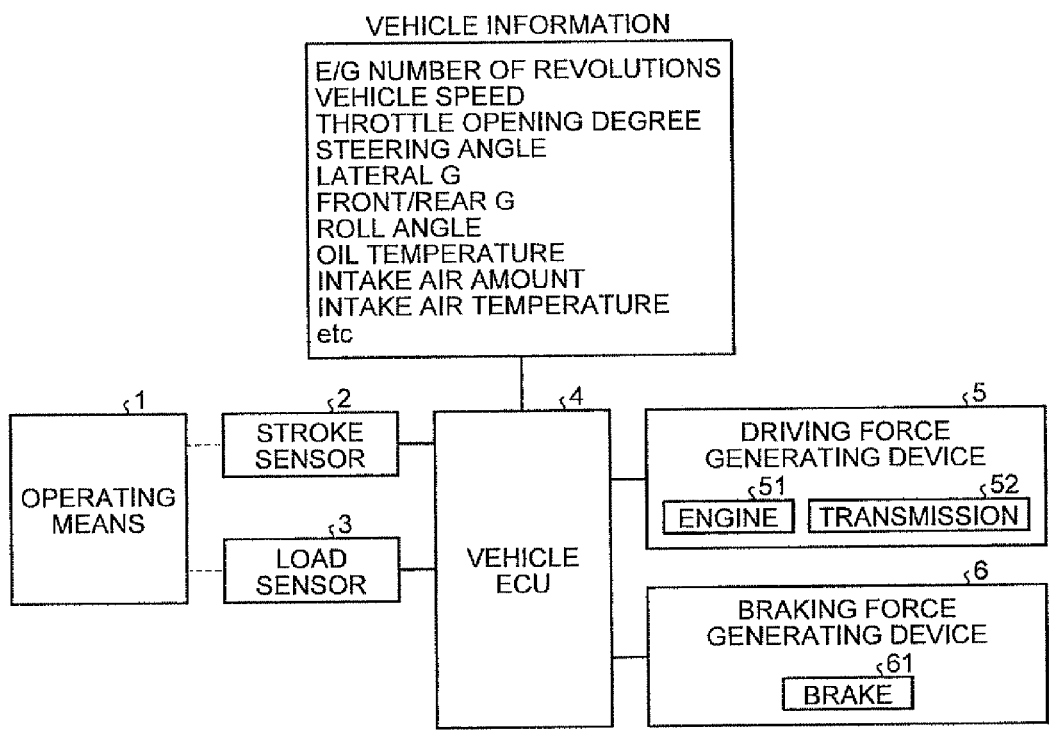
FIG. 1 is a schematic view illustrating a configuration of a braking/driving force control device of a vehicle according to an embodiment of the present invention.

FIG. 1 is a schematic view illustrating a configuration of a braking/driving force control device of a vehicle according to an embodiment of the present invention. As illustrated in FIG. 1, the driving force control device according to the embodiment includes an operating means 1, a stroke sensor (stroke detecting means) 2, a load sensor (load detecting means) 3, a vehicle ECU 4 (control means), a driving force generating device 5, and a braking force generating device 6.

The operating means 1 is a means by which a driver executes an acceleration operation and a deceleration operation by an integral pedal and in which an accelerator pedal for executing an acceleration operation for operating a travel of a vehicle and a brake pedal for executing a deceleration operation are aggregated as a single unit so that a single pedal is provided with a function as the accelerator pedal and a function as the brake pedal.

The stroke sensor 2 detects a stroke amount due to an operation of the operating means 1 by the driver and outputs the stroke amount to the vehicle ECU 4. The load sensor 3 detects a load due to an operation of the operating means 1 by the driver and outputs the load to the vehicle ECU 4. A specific mode of a configuration of the operating means 1 as well as detection methods of the stroke sensor 2 and the load sensor 3 will be described later.

The vehicle ECU 4 controls acceleration of the vehicle based on the stroke amount detected by the stroke sensor 2 and further controls deceleration of the vehicle based on the load detected by the load sensor 3. Specifically, the vehicle ECU 4 calculate a target braking/driving force based on the stroke amount (operation amount) detected by the stroke sensor 2 and the load detected by the load sensor 3 and outputs the target braking/driving force to the driving force generating device 5 and the braking force generating device 6. In the case, the vehicle ECU 4 executes a control so that the driving force becomes larger as the stroke amount detected by the stroke sensor 2 is larger and further so that the braking force becomes larger as the load detected by the load sensor 3 is larger. The vehicle ECU 4 is input with vehicle information such as an engine (E/G) number of revolutions, a vehicle speed, a throttle opening degree and its change speed, a steering angle, a lateral G, a front/rear G, a roll angle, an oil temperature, an intake air amount, an intake air temperature and the like from not illustrated various sensors.

The driving force generating device 5 includes an engine 51 and a transmission 52 accompanying with the engine 51 and controls the engine 51 and the transmission 52 so that the target braking/driving force input from the vehicle ECU 4 is obtained. Note that an electric motor may be used in place of the engine and further the engine may be combined with the electric motor. The braking force generating device 6 includes a brake 61 such as a wheel brake and the like and controls the brake 61 so that the target braking/driving force input from the vehicle ECU 4 is obtained.

According to the embodiment, since there are provided the operating means 1 for executing the acceleration operation and the deceleration operation by the integral pedal, the stroke sensor 2 for detecting the stroke amount due to the operation of the operating means 1, the load sensor 3 for detecting the load due to the operation of the operating means 1, and the vehicle ECU 4 for controlling the acceleration of the vehicle based on the stroke amount detected by the stroke sensor 2 and further controlling the deceleration of the vehicle based on the load detected by the load sensor 3, a driving operation of the driver can be made easy as well as the driver can be easily aware of a boundary between an acceleration region and a deceleration region. First to fifth examples of the braking/driving force control device configured as described above will be explained below.

First Example

Figure 2:
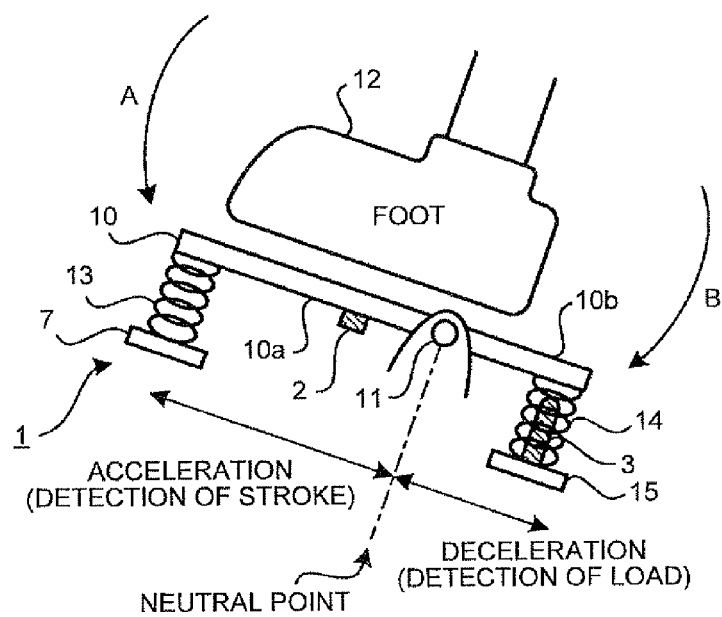
FIG. 2 is a schematic view for explaining a schematic configuration of an operating means according to a first example.

A first example of the braking/driving force control device of FIG. 1 will be explained referring to FIGS. 2 to 4. FIG. 2 is a schematic view for explaining a schematic configuration of an operating means 1.

In FIG. 2, an accelerator brake pedal plate (hereinafter, called "pedal plate") 10 is attached to a vehicle chassis (not illustrated) so that the pedal plate 10 can be turned by a foot 12 of a driver in an arrow A direction or an arrow B direction about a pedal fulcrum 11 disposed to the pedal plate 10 on a somewhat lower side from a center thereof. The pedal plate 10 is composed of an accelerator section 10a above the pedal fulcrum 11 and a brake section 10b below the fulcrum 11. The accelerator section 10a is disposed with the stroke sensor 2 described above for detecting a stroke amount of the accelerator section 10a. Further, a spring 13, which applies a reaction force to a depressing operation of the accelerator section 10a, is attached between the accelerator section 10a and a vehicle chassis 7. On the other hand, a spring 14 is attached between the brake section 10b and a stopper 15 fixed to the vehicle chassis (not illustrated), and the stopper 15 is disposed with the load sensor 3 described above which detects a load due to an operation of the brake section 10b. Note that the positions at which the stroke sensor 2 and the load sensor 3 are disposed are not limited to the example.

The vehicle is started or accelerated by depressing the accelerator section 10a of the pedal plate 10 by a toe of the foot 12 of the driver in the arrow A direction. On the other hand, the vehicle is decelerated or stopped by depressing the brake section 10b of the pedal plate 10 by a heel of the foot 12 of the driver in the arrow B direction.

Figures 1, 3:
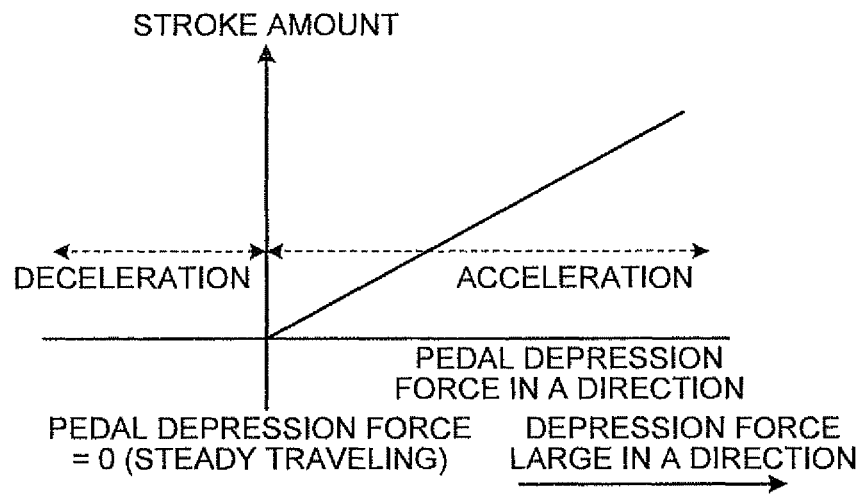
Figures 2, 3:
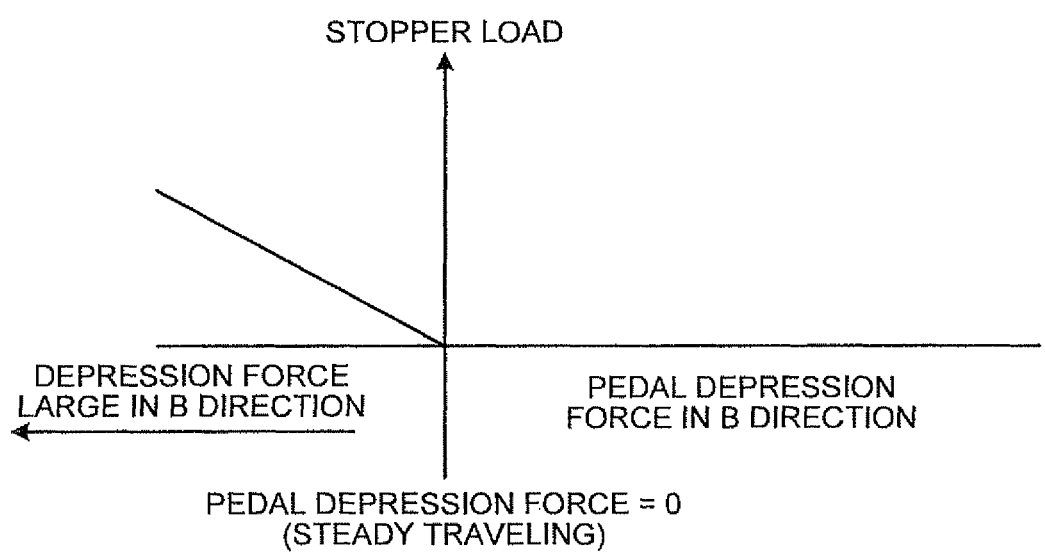

FIG. 3 is a view for explaining the relation between a depression force of the pedal plate 10 and requested acceleration/deceleration characteristics, wherein FIG. 3-1 is a view for explaining the relation between a pedal depression force in the A direction of FIG. 2 and a stroke amount detected by the stroke sensor 2, and FIG. 3-2 is a view for explaining the relation between a pedal depression force in the B direction of FIG. 2 and a load detected by the load sensor 3.

In FIG. 3-1, a horizontal axis shows the depression force of the pedal plate 10 in the A direction, and a vertical axis shows the stroke amount detected by the stroke sensor 2. A stroke amount in response to the depression force of the pedal plate 10 in the A direction is detected by the stroke sensor 2, and a requested acceleration G in response to the stroke amount is obtained.

In FIG. 3-2, a horizontal axis shows the depression force of the pedal plate 10 in the B direction, and a vertical axis shows the load detected by the load sensor 3. The load in response to the depression force of the pedal plate 10 in the B direction is detected by the load sensor 3 and a requested deceleration G in response to the load is obtained.

Stroke amount>0 shows an acceleration operation region, a neutral point when stroke amount=0 and load=0 shows an intermediate region (steady traveling region), and load>0 shows a deceleration operation region. Note that when it is felt in the intermediate region that the requested acceleration G is slightly strong, the requested acceleration G may be set to G=appropriate light target deceleration G (fixed value).

When stroke amount>0 as well as load>0 are detected, the vehicle ECU 4 determines that the stroke sensor 2 and the load sensor 3 are abnormal.

Figures 1, 9:
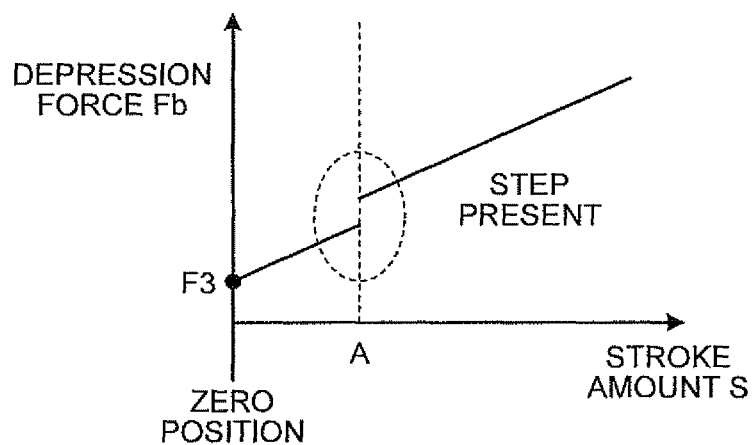
Figures 2, 9:
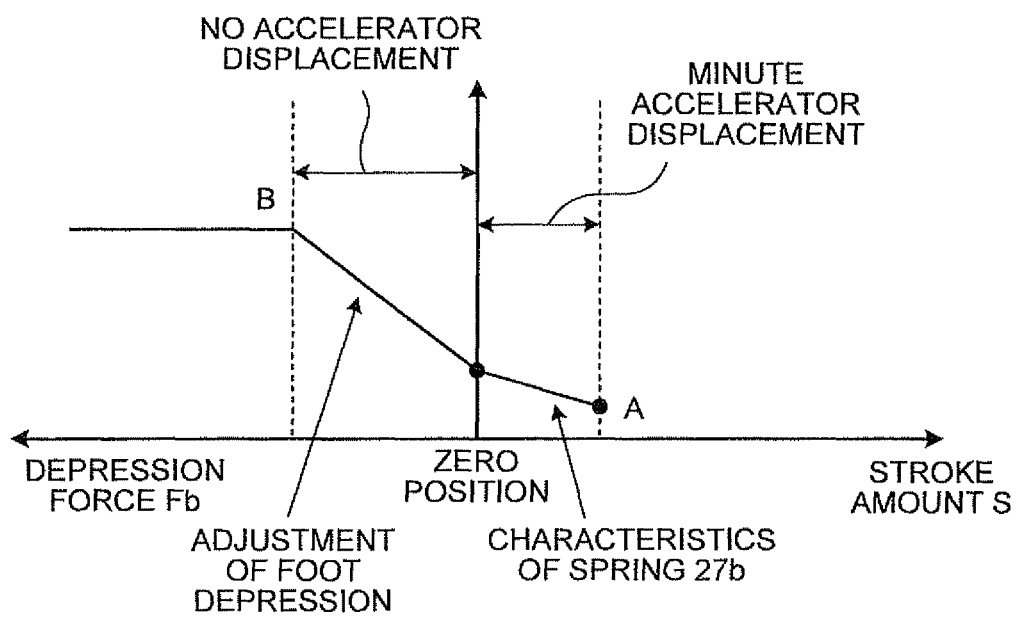
Figures 3, 9:
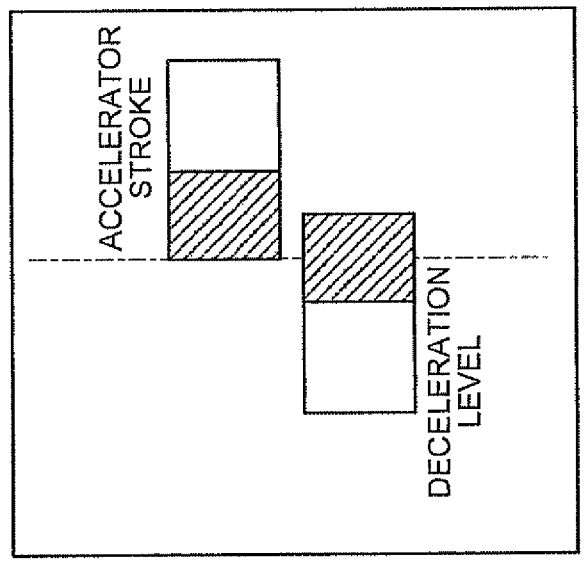
Figures 4, 9:
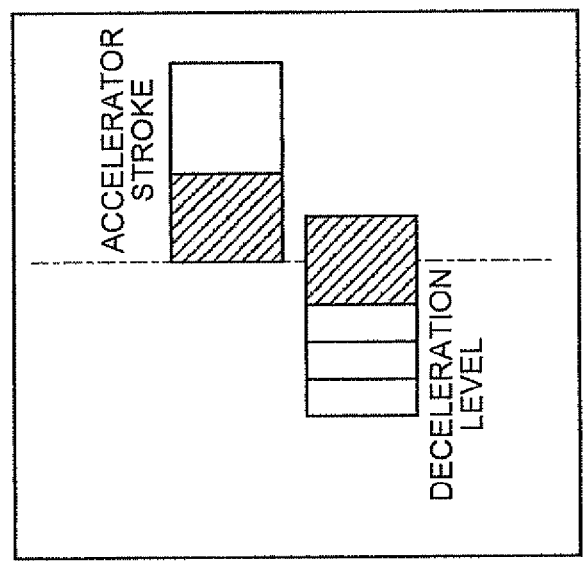

FIG. 4 is a flowchart for explaining an operation for the vehicle ECU 4 to calculate a target braking/driving force in response to an operation of the operating means 1. In the figure, f( ) shows a function. First, the vehicle ECU 4 determines whether or not load detected by the load sensor 3≤load zero determination value K0 (step S1). When load detected by the load sensor 3≤load zero determination value K0 is true, ("Yes" at step S1), the vehicle ECU 4 determines whether or not stroke detected by the stroke sensor 2>stroke zero determination value S0 is true (step S2). When stroke detected by the stroke sensor 2>stroke zero determination value S0 is not true ("No" at step S2), the vehicle ECU 4 determines that a neutral state is achieved (step S3) and sets requested G=0 (step S4).

Further, at step S2, when stroke detected by the stroke sensor 2>stroke zero determination value S0 is true ("Yes" at step S2), the vehicle ECU 4 determines that an acceleration state is achieved and sets requested acceleration G=f (stroke amount, vehicle speed) based on the stroke amount and the vehicle speed set (step S6).

At the step S1, when load detected by the load sensor 3≤load zero determination value K0 is not achieved ("No" at step S1), the vehicle ECU 4 determines whether or not stroke detected by the stroke sensor 2≤stroke zero determination value S0 (step S7). When stroke detected by the stroke sensor 2≤stroke zero determination value S0 is true ("Yes" at step S7), the vehicle ECU 4 determines that a deceleration state is achieved (step S8) and sets requested deceleration G=f (load, vehicle speed) (step S9).

Further, at step S7, when stroke detected by the stroke sensor 2≤stroke zero determination value S0 is not achieved ("No" at step S7), that is, when stroke amount>0 as well as load>0 are detected, the vehicle ECU 4 determines that the stroke sensor 2 and the load sensor 3 are abnormal (step S10) and sets requested G=minute constant value (step S11). As described above, when a combination which does not occur in a normal state occurs in a combination of the stroke and the load, although the vehicle ECU 4 determines that the sensors are abnormal, requested G=0 is not true and a minute acceleration request which permits the vehicle to travel to a repair factory is set.

The vehicle ECU 4 calculates the target braking/driving force based on the requested G set at steps S1 to S11 (step S12).

According to the first example, since the pedal plate 10 is turnably configured about the fulcrum 11, the stroke sensor 2 detect the stroke amount generated by that the pedal plate 10 is depressed in one direction about the fulcrum 11, whereas the load sensor 3 detects the load generated by that the pedal 10 is depressed in the other direction about the fulcrum 11, the driver can request the acceleration G by the pedal stroke in the acceleration and can request the deceleration G by the pedal depression force (load) in the deceleration. Conventionally, since an accelerator stroke has been detected in the acceleration and a depression force (cylinder hydraulic pressure) has been used by a brake in the deceleration for a long period, the operation described above can be fit to a driver's inertia. Further, since an acceleration request can be executed by depressing the pedal plate 10 by the toe and a deceleration request can be executed by depressing the pedal plate 10 by the heel, the driver can be easily aware of a boundary between an acceleration region and a deceleration region and further a driving operation becomes easy.

Further, according to the first example, in an intermediate region between an acceleration operation region and an deceleration operation region of the pedal plate 10, since the vehicle ECU 4 executes a braking/driving force control by which the vehicle steadily travels, when the driver releases the foot from the pedal plate 10, since a control is executed to satisfy requested G=0, the vehicle can simply realize a steady vehicle speed travel.

Further, according to the first example, since the vehicle ECU 4 detects that the sensors are abnormal based on the stroke amount detected by the stroke sensor 2 and the load detected by the load sensor 3, it can be easily detected by a simple method that the stroke sensor 2 and the load sensor 3 are abnormal.

Second Example

Figure 5:
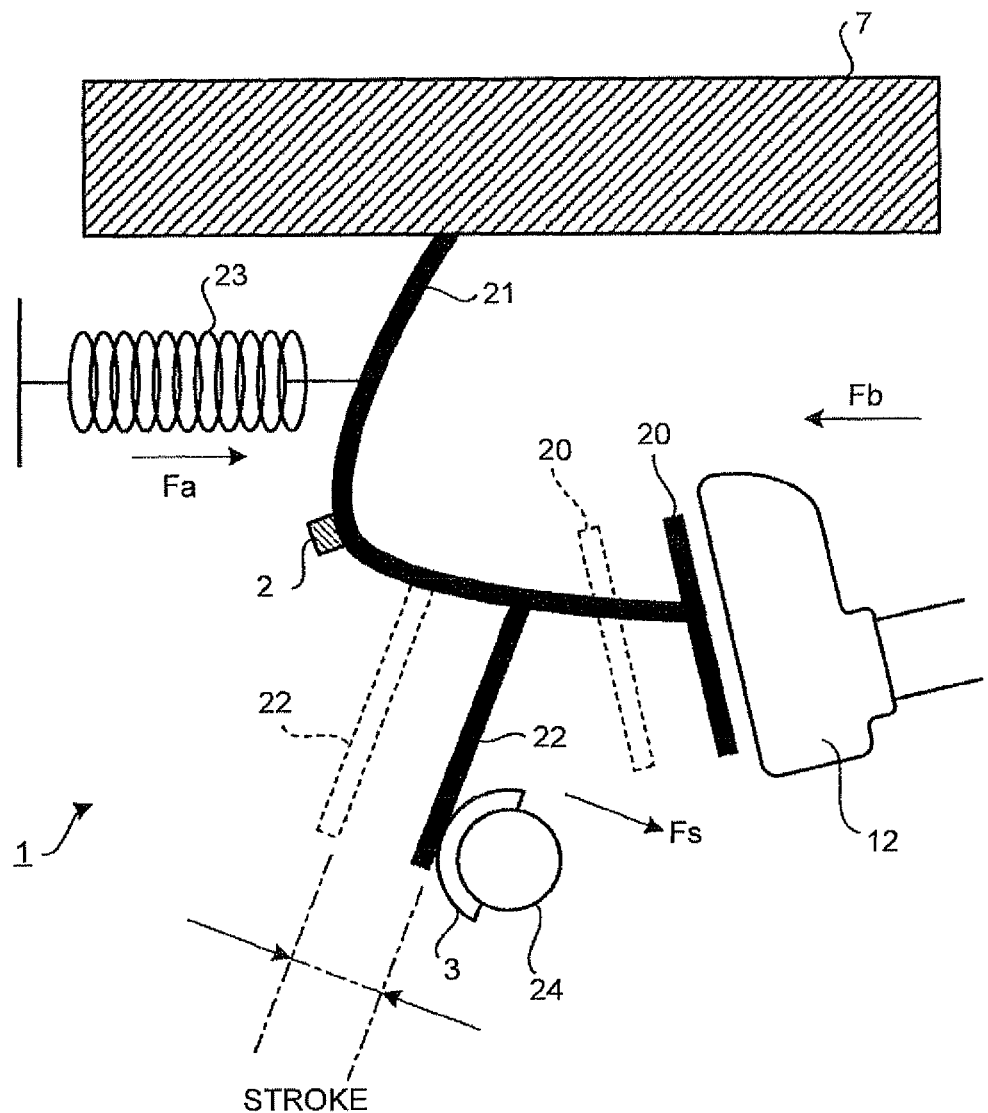
FIG. 5 is a schematic view for explaining a schematic configuration of an operating means according to a second example.

A second example of the braking/driving force control device will be explained referring to FIGS. 5 to 7. FIG. 5 is a schematic view for explaining a schematic configuration of an operating means 1 according to the second example.

In FIG. 5, a pedal plate 20 is disposed to the other end side of an arm (main shaft section) 21 whose one end side is slidably supported to a vehicle chassis 7. The arm 21 is disposed with a spring 23 which is an elastic member for urging the pedal plate 20 in a direction opposite to an operation direction (return direction) of the pedal plate 20 and generating a reaction force in response to a depression force of the pedal plate 20 by a driver and a bar 22 which is a press member for pressing a stopper 24. Further, the arm 21 is disposed with the stroke sensor 2 described above for detecting a stroke amount of the pedal plate 20. The vehicle chassis (not illustrated) is fixed with a stopper 24 which is a load receiving member to which a load Fs is applied by the bar 22. A surface of the stopper 24 is disposed with the load sensor 3 described above for detecting the load Fs to the stopper 24 by the bar 22. Here, although the stopper 24 is disposed with the load sensor 3, the load sensor 3 may be disposed to the bar 22 side.

In the figure, when a depression force of the pedal plate 20 by a foot is shown by Fb and an elastic force of the spring 23 is shown by Fa, a detection value of the load sensor 3 pressed by the bar 22 becomes detected value of the load sensor 3=elastic force Fa of the spring 23−depression force Fb.

Figures 1, 6:
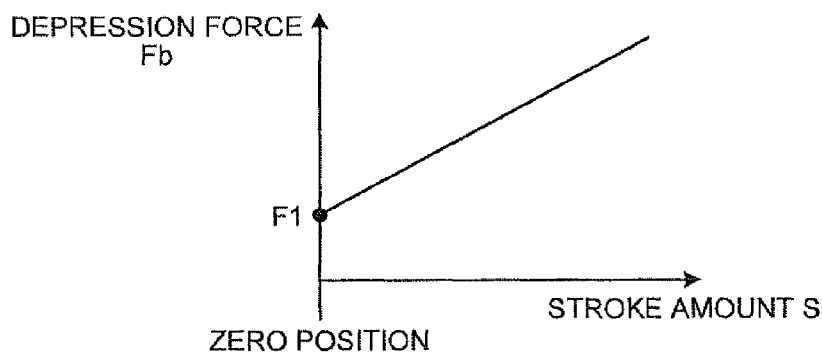
Figures 2, 6:
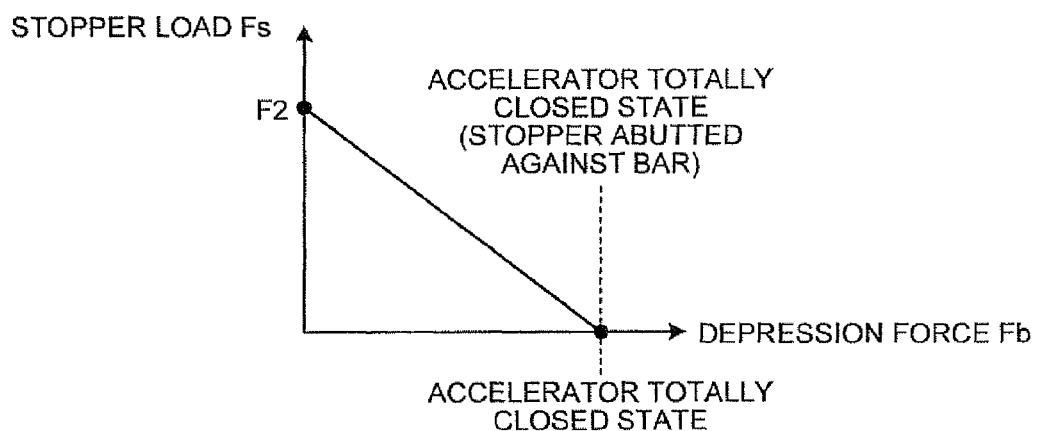
Figures 3, 6:
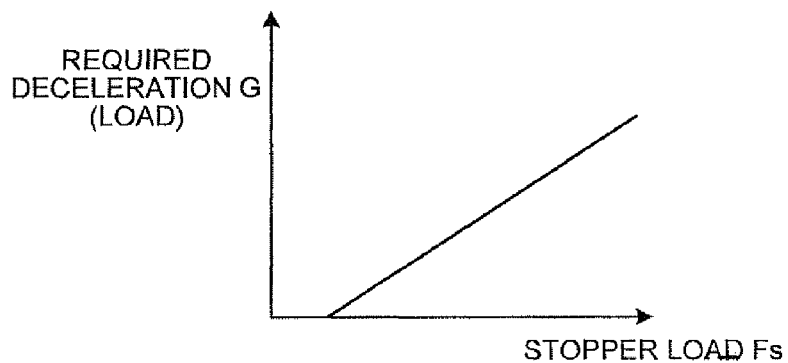

FIG. 6-1 is a view illustrating the relation between the depression force Fb and a pedal stroke of the pedal plate 20, wherein a horizontal axis shows the stroke amount S and a vertical axis shows the depression force Fb of the pedal plate 20. FIG. 6-2 is a view illustrating the relation between the depression force Fb of the pedal plate 20 and the load Fs of the stopper 24, wherein a vertical axis shows the stopper load Fs and a horizontal axis shows the depression force Fb of the pedal plate 20. FIG. 6-3 is a view illustrating the relation between the load Fs of the stopper 24 and the requested deceleration G, wherein a horizontal axis shows the load Fs of the stopper 24 and a vertical axis shows the requested deceleration G.

In FIG. 5 described above, the pedal plate 20 is urged by the spring 23, and, in a state that the depression force Fb is not applied to the pedal plate 20, an accelerator is in a totally closed state (stroke amount=zero) and the stopper 24 is pressed by the bar 22. When the depression force Fb of the pedal plate 20 becomes equal to or more than a predetermined value F1 by a depression operation of the driver, a stroke is generated (refer to FIG. 6-1), and the requested acceleration G in response to the stroke amount S is obtained. Thereafter, when the depression force Fb of the pedal plate 20 becomes small, the bar 22 is abutted against the stopper 24 by an urging force of the spring 23 and the accelerator is in the totally closed state. After the abutment, when the depression force Fb of the pedal plate 20 becomes small, a load of the stopper 24 increases (refer to FIG. 6-2), and when the load of the stopper 24 increases, the requested deceleration G becomes large (refer to FIG. 6-3).

When the driver executes acceleration, the driver executes the acceleration in response to a depression amount of the pedal plate 20. When deceleration is executed, the deceleration can be executed by gradually reducing the depression force Fb of the pedal plate 20 after the accelerator has been totally closed.

FIG. 7 is a flowchart for explaining an example of an operation for the vehicle ECU 4 to calculate the requested deceleration G in response to an operation of the pedal plate 20. In the figure, f( ) shows a function in which K1<K2. In the figure, first, the vehicle ECU 4 determines whether or not accelerator opening degree acc corresponding to stroke amount<predetermined opening degree (step S21). When accelerator opening degree acc<predetermined opening degree is not achieved ("No" at step S21), the vehicle ECU 4 determines that the deceleration is not executed, sets accelerator slow return determination flag FSLOW=0 and accelerator fast return determination flag FFAST=0 (step S26), and goes to step S31.

At step S21, when accelerator opening degree acc<predetermined opening degree is true ("Yes" at step S21), the vehicle ECU 4 calculates an accelerator return speed x by accelerator return speed x=differential value d/dt (acc) of accelerator opening degree (step S22). The vehicle ECU 4 determines whether or not accelerator return speed x<−K1 (step S23), and when accelerator return speed x<−K1 is not achieved ("No" at step S23), the vehicle ECU 4 determines that the deceleration is not executed, sets accelerator slow return determination flag FSLOW=0 and accelerator fast return determination flag FFAST=0 (step S26), and goes to step S31.

Further, at step S23, when accelerator return speed x<−K1 is true ("Yes" at step S23), the vehicle ECU 4 determines whether or not accelerator return speed x>−K2 is true (step S24), and when accelerator return speed x>−K2 is not true ("No" at step S24), the vehicle ECU 4 determines that the accelerator is promptly returned, sets accelerator return slow determination flag FSLOW=0 and accelerator fast return determination flag FFAST=1 (step S27), and goes to step S31.

Further, at step S24, when accelerator return speed x>−K2 is true ("Yes" at step S24), the vehicle ECU 4 determines that the accelerator is slowly returned, sets accelerator slow return determination flag FSLOW=1 and accelerator fast return determination flag FFAST=0 (step S25), and goes to step S31.

At step S31, the vehicle ECU 4 determines whether or not accelerator slow return determination flag FSLOW=1 is true. When accelerator slow return determination flag FSLOW=1 is true ("Yes" at step S31), the vehicle ECU 4 sets requested deceleration G=f (load sensor value) (step S32).

On the other hand, at step S31, when accelerator slow return determination flag FSLOW=1 is not true, ("No" at S31), the vehicle ECU 4 determines whether or not accelerator fast return determination flag FFAST=1 is true (step S33). When accelerator fast return determination flag FFAST=1 is true (step S33 "Yes"), the vehicle ECU 4 outputs requested deceleration G=f (load maximum value) (step S34), whereas when accelerator fast return determination flag FFAST=1 is not achieved ("No" at step S33), the vehicle ECU 4 set requested deceleration G=f (load zero) (step S35).

As described above, the requested deceleration G may be determined to three steps in response to a return change speed of the accelerator opening degree just before the accelerator is totally closed. When the return change speed of the accelerator opening degree is slow, the requested deceleration may be set to zero (for example, coasting with an accelerator free, meandering running) regardless of a detected load value, when the return change speed of the accelerator opening degree is medium, the requested deceleration G may be determined from a stopper load (for example, ordinary deceleration region), and when the return change speed of the accelerator opening degree is fast, the requested deceleration G may be set to a maximum load value without depending on the stopper load (at the time of abrupt deceleration).

According to the second example, since the pedal plate 20 is configured so as to be able to move back and forth and to be moved in a backward direction by a depressing operation, the spring 23 is provided which urges the pedal plate 20 in its forward direction and applies the reaction force in response to a depression operation of the pedal plate 20, the stroke sensor 2 detects a stroke amount in the backward direction in response to the depression operation of the pedal plate 20, and the load sensor 3 detects a load of the pedal plate 20 in a forward direction, the acceleration and the deceleration can be executed by operating the pedal plate 20 in one direction.

Further, according to the second example, since the stopper 24 is provided which is abutted against the bar 22 disposed to a part of the pedal plate 20 and receives a load in the forward direction and the load sensor 3 detects a load received by the stopper 24, the load can be detected with a high accuracy by a simple configuration.

Further, according to the second example, when a depression operation amount of the pedal plate 20 becomes equal to or less than a predetermined value (for example, the accelerator is totally closed), the bar 22 is abutted against the stopper 24 and receives the load, an acceleration operation and a deceleration operation can be continuously executed.

Third Example

A third example of the braking/driving force control device will be explained referring to FIGS. 8 to 9-2. The third example is configured in the second example such that gradient characteristics of a load received by a stopper 24 are set to two steps with respect to a stroke amount of a pedal plate 20.

Figure 8:
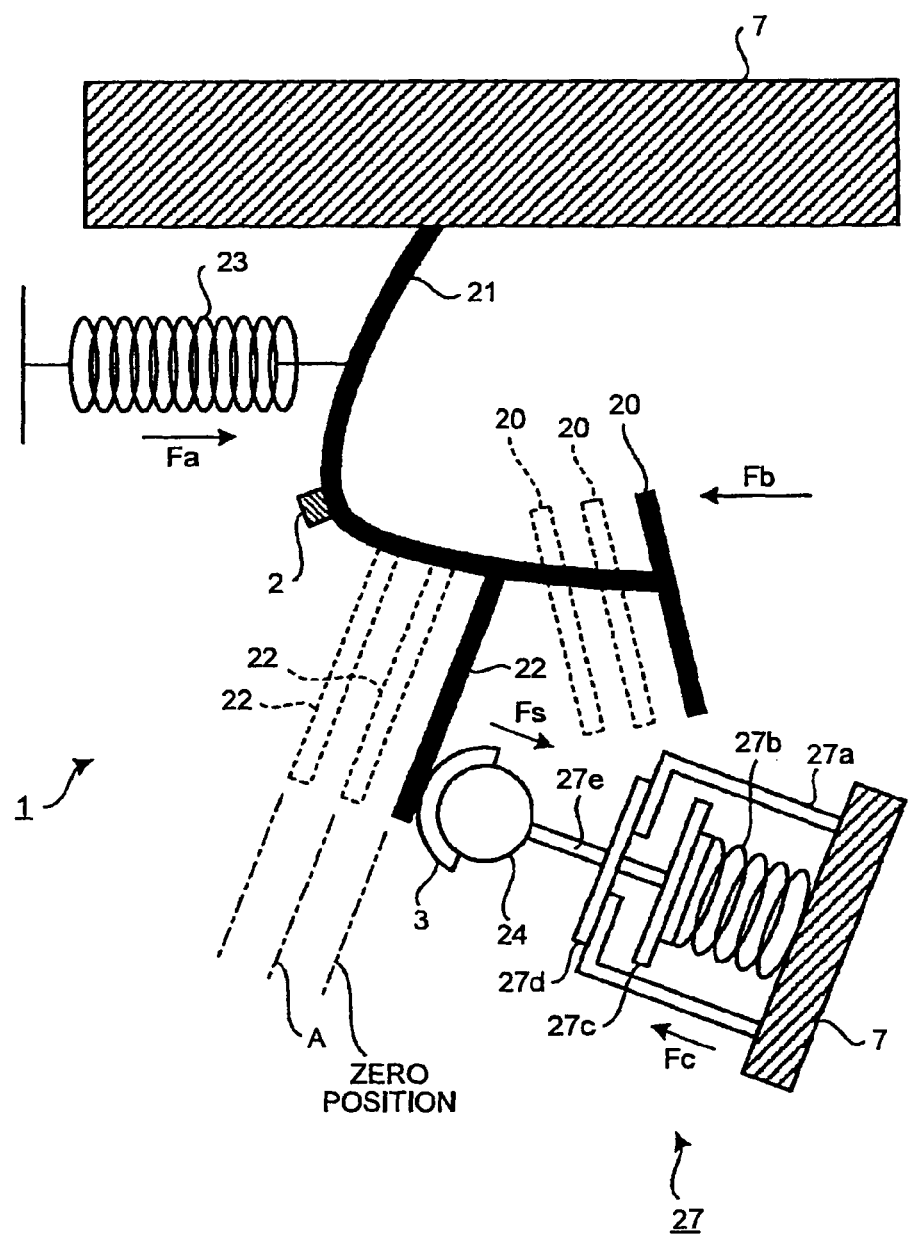
FIG. 8 is a schematic view for explaining a schematic configuration of an operating means according to a third example.

FIG. 8 is a schematic view for explaining a schematic configuration of an operating means 1 according to the third example. In FIG. 8, sections having the same functions as FIG. 5 are denoted by the same reference signs, and an explanation of common sections is omitted. As illustrated in FIG. 8, the stopper 24 is not fixed to a vehicle chassis 7 and the stopper 24 is fixed to an urging mechanism 27. The urging mechanism 27 is fixed to the vehicle chassis 7. The urging mechanism 27 includes a spring 27b for urging the stopper 24 in an operation direction of the pedal plate 20 and a regulation member 27c for regulating a movement of the stopper 24 in a pedal operation direction in a housing 27a and include a regulation member 27d for regulating a movement of the stopper 24 in a pedal return direction and a coupling member 27e fixed to the stopper 24 for causing an urging force of the spring 27b to act on the stopper 24 outside of the housing 27a.

FIG. 9-1 is a view illustrating the relation between a depression force and a stroke amount S of the pedal plate 20, and, in the figure, a horizontal axis shows the stroke amount S and a vertical axis shows the pedal depression force Fb. FIG. 9-2 is a view illustrating the relation among a stopper load Fs, the stroke amount S, and the pedal depression force Fb, and, in the figure, a horizontal axis shows the pedal depression force Fb and the stroke amount and a vertical axis shows the stopper load.

In FIG. 8 described above, the pedal plate 20 is urged by a spring 23 in a pedal return direction (initial position direction) by an urging force Fa as well as urged by the spring 27b of the urging mechanism 27 in a pedal operation direction by an urging force Fc. Here, since Fa>Fc is set, in a state that the depression force Fb is not applied to the pedal plate 20 (depression force Fb=0), an accelerator is in a totally closed state (position of the stopper 24=zero position).

When the pedal plate 20 is depressed in the state that the accelerator is totally closed (position of the stopper 24=zero position), a stroke is generated when the depression force Fb of the pedal 20 becomes equal to or more than a predetermined value F3 (refer to FIG. 9-1) and a requested acceleration G in response to a stroke amount of the pedal 20 is obtained. Here, since the urging force Fc of the spring 27b of the urging mechanism 27 acts on a bar 22 via the stopper 24, the depression force Fb of the pedal 20 is promoted from the zero position to an A point where a movement of the stopper 24 is regulated by the regulation member 27c. Since the bar 22 is away from the stopper 24 after the A point, the urging force Fs of the spring 27b does not act on the bar 22, characteristic gradients of the pedal depression force Fb and the stroke amount S change, and the pedal 20 becomes heavy (refer to FIG. 9-1).

Thereafter, when the depression force Fb of the pedal plate 20 becomes small, the bar 22 is abutted against the stopper 24 (the A point) by the urging force Fa of the spring 23, and, as illustrated in FIG. 9-2, between the A point and the zero position, the urging force Fa of the spring 23 acting in the pedal return direction and the urging force Fc of the spring 27b acting in the pedal operation direction act on the stopper 24 (Fa−Fc), thereby a minute load adjustment can be executed by that a driver depressingly adjusts the load Fs of the stopper 24 in a stroke present state.

As illustrated in FIG. 9-2, between the zero position and a B point (A point at which the stopper load is maximized with the stroke set to zero), a load adjustment can be executed in a small to medium degree by that the driver depressingly adjusts the load of the stopper 24 in the stroke zero state.

According to the third example, when the stopper 24 receives the load by that the bar 22 is abutted thereagainst, since the gradient characteristics of the load are set to the two steps with respect to the stroke amount of the pedal plate 20, the characteristics gradient of the load of the stopper can be changed just before the accelerator is totally closed and thus the depression force is abruptly changed just before the accelerator is totally closed, thereby the driver can easily recognize a function switch point to a deceleration control. When a negative drive side is used, since an accelerator stroke is unnecessary, an operation can be simply executed without displacing a foot.

Further, according to the third example, since the stopper 24 is movably configured and includes the spring 27b which urges the stopper 24 in a direction opposite to a direction where the bar 22 urges the stopper 24, the gradient characteristics of the load received by the stopper 24 can be set to the two steps with respect to the stroke amount of the pedal 20 by a simple configuration.

Note that an accelerator opening degree (accelerator stroke) and a deceleration level may be displayed by providing a display unit. FIGS. 9-3 and 9-4 are views illustrating display examples of the accelerator stroke and the deceleration level of the display unit. The provision of the display unit as described above permits the driver to find a request level at a start point of a negative driving force request and during a period of the request while operating the pedal plate 20, thereby the driver can easily adjust a deceleration.

Fourth Example

A fourth example is configured in the third example such that a pedal plate receiving section 30 is provided, a pedal plate 20 is coupled with the pedal plate receiving section 30 by a spring (elastic member) 31, and gradient characteristics of a load received by a stopper 24 is set to three steps with respect to a stroke amount.

Figure 10:
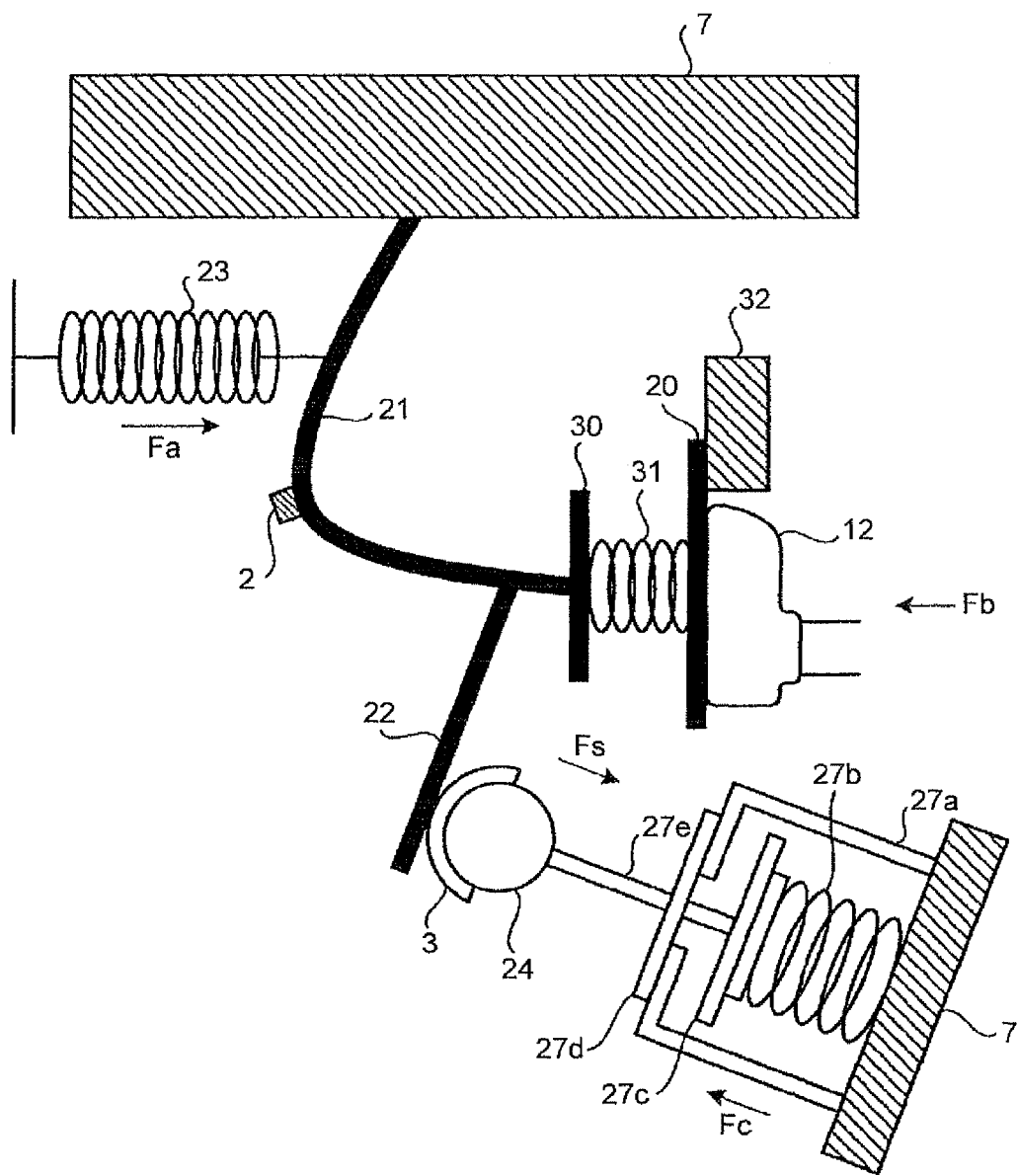
FIG. 10 is a schematic view for explaining a schematic configuration of an operating means according to a fourth example.

FIG. 10 is a schematic view for explaining a schematic configuration of an operating means 1 according to the fourth example. In FIG. 10, components having the same functions as FIG. 8 are denoted by the same reference signs, and an explanation of common portions is omitted. As illustrated in FIG. 10, the pedal plate 20 is coupled with the pedal plate receiving section 30 by the spring 31 which is an elastic member and further a movement of the pedal plate 20 in a pedal return direction is regulated by a stopper 32.

Figures 1, 11:
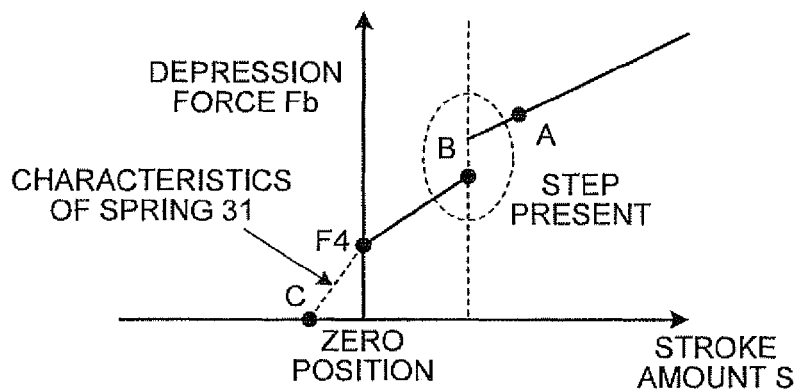
Figures 2, 11:
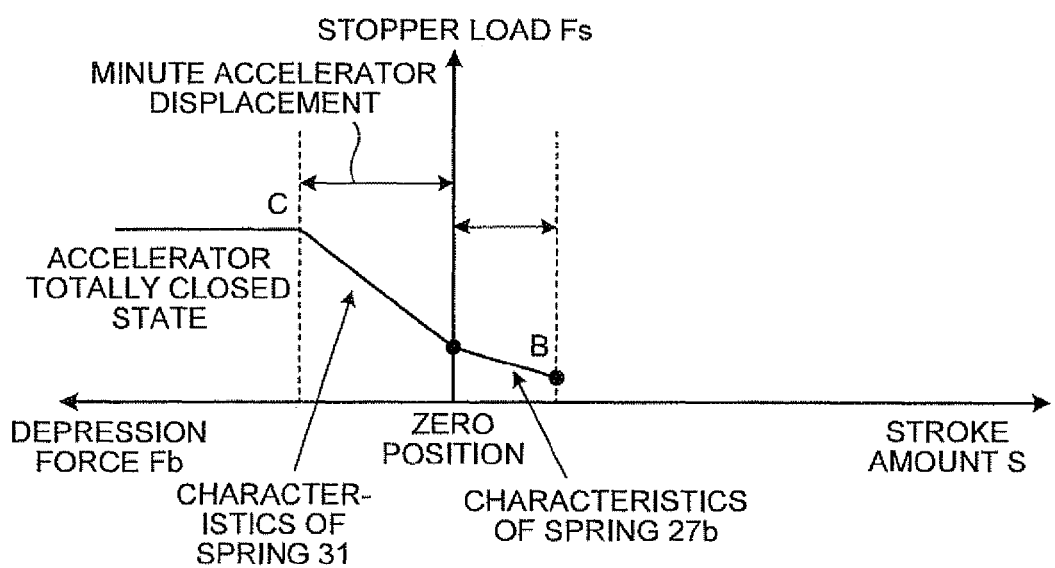

FIG. 11-1 is a view illustrating the relation between a depression force Fb of the pedal plate 20 and a stroke amount S, and, in the figure, a horizontal axis shows the stroke amount S and a vertical axis shows the depression force Fb of the pedal plate 20. FIG. 11-2 is a view illustrating the relation among a stopper load Fs, the stroke amount S, and the pedal depression force Fb of the pedal plate 20, and, in the figure, a horizontal axis shows the pedal depression force Fb and the stroke amount S and a vertical axis shows the stopper load Fs.

Figure 12:
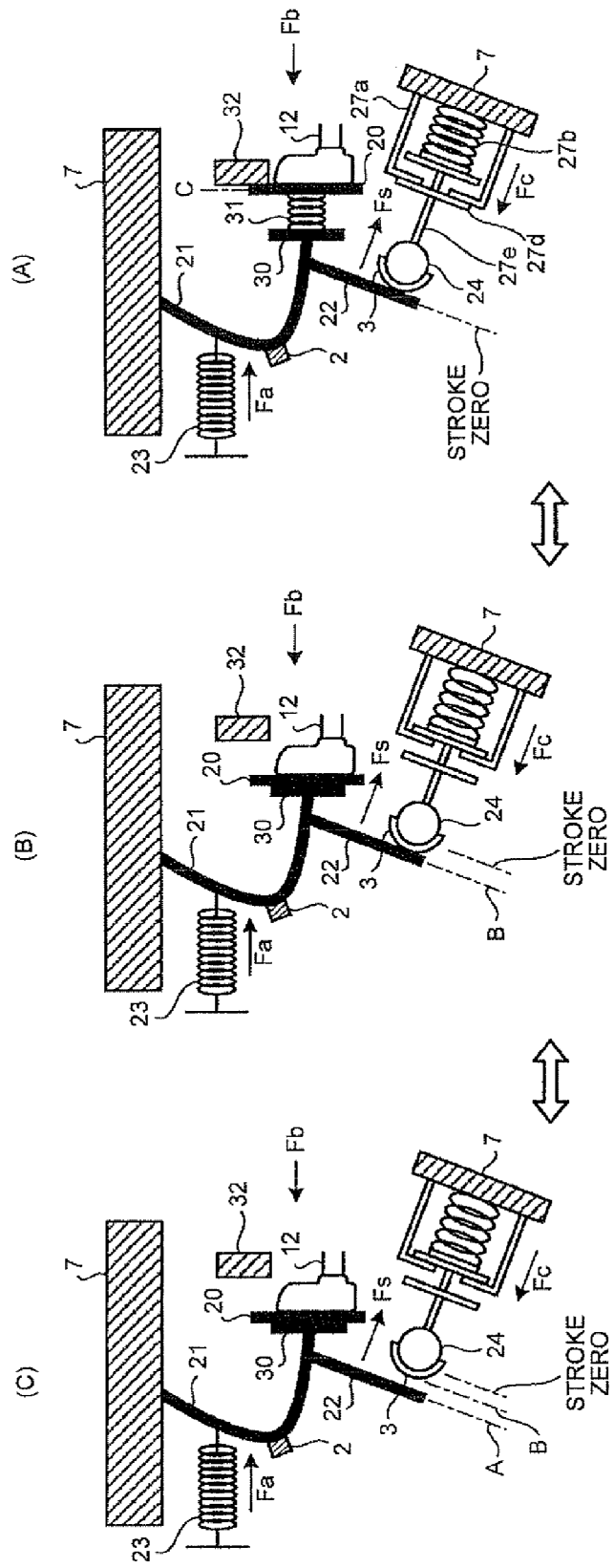
FIG. 12 is a view for explaining the relation between an operation of a pedal plate and a stopper load.

FIG. 12 is a view explaining the relation between an operation of the pedal plate 20 and the stopper load Fs of FIG. 10. In the figure, (A) shows a stroke zero state to a pedal plate zero position (load sensor=maximum load, the pedal plate 20 is in a contact state with the stopper 32 (the spring 31 is not displaced)). (B) shows a state just before a stroke zero (stroke amount S=B, load sensor=load zero, the pedal plate 20 is in a non-contact state with the stopper). (C) shows a stroke present state (stroke amount=A, load sensor=zero load, the pedal plate 20 is in a non-contact state with the stopper 32 (the spring 31 is being displaced)).

A pedal operation in an acceleration will be explained referring to FIGS. 11-1, 11-2, and 12. In FIG. 12(A), an urging force Fa acts on the pedal plate 20 by the spring 23 in a pedal return direction (initial position direction) as well as an urging force Fc acts in a pedal operation direction by a spring 27b. Here, since Fa>Fc is set, in a state that the depression force Fb is not applied to the pedal plate 20 (depression force Fb=0), the pedal plate 20 is regulated by the stopper 32 and located at an initial position (C point), an accelerator is in a totally closed state, and a load of the load sensor 3 due to a bar 22 is maximized.

When the pedal plate 20 is depressed in the state, the spring 31 is compressed, and the depression force Fb becomes equal to or more than a constant value F4, a stroke is generated as illustrated in FIG. 12 (B) (refer to FIG. 11-1), and a requested acceleration G in response to the stroke amount S of the pedal plate 20 is obtained. A pedal weight in response to characteristics of the spring 31 is obtained from the C point to a stroke zero position. Although the urging force Fc due to the spring 27b acts in the pedal operation direction from the stroke zero position to a B point, since the urging force Fa due to the spring 23 acts in the pedal return direction (initial position direction), a characteristics gradient becomes small in comparison with the portion from the C point to the stroke zero position, thereby the pedal becomes heavy. As illustrated in FIG. 12(C), since the bar 22 is away from the stopper 24 after the B point, the urging force Fc of the spring 27b for assisting a depression of the pedal plate 20 does not act, characteristics gradients of the depression force Fb and the stroke amount S change, and the pedal plate 20 becomes heavy. As described above, the characteristics gradients of the depression force Fb and the stroke amount S, that is, a pedal weight is further set to three steps.

Thereafter, when the depression force Fb of the pedal plate 20 becomes small, the bar 22 is abutted against the stopper 24 (the B point) by the urging force Fa of the spring 23 as illustrated in FIG. 12(B), and, as illustrated in FIG. 11-2, between the B point and the zero position, the urging force Fa of the spring 23 acting in the pedal return direction and the urging force Fc of the spring 27b acting in the pedal operation direction act on the stopper 24 (Fa−Fc), thereby a minute load adjustment can be executed by that a driver depressingly adjusts the load of the stopper 24 in a stroke present state. After the stroke zero (a zero position to a C point), since an urging force of the spring 31, which acts in the pedal return direction, acts on the stopper 24, a load adjustment can be executed in a small to medium degree by that the driver depressingly adjusts the load Fs of the stopper 24 in the stroke zero state.

According to the fourth example, a configuration is such that the pedal plate receiving section 30 is provided, the pedal plate 20 is coupled with the pedal plate receiving section 30 by the spring (elastic member) 31, and gradient characteristics of the load received by the stopper 24 are set to the three steps with respect to the stroke amount, the gradient characteristics of the load received by the stopper 24 can be set to the three steps with respect to the stroke amount by a simple configuration.

Fifth Example

Although the first to fourth examples are configured such that the load sensor 3 and the stopper 24 are disposed below the pedal plate 20, the present invention is not limited thereto and the load sensor 3 and the stopper 24 may be disposed at any positions.

Figures 1, 13:
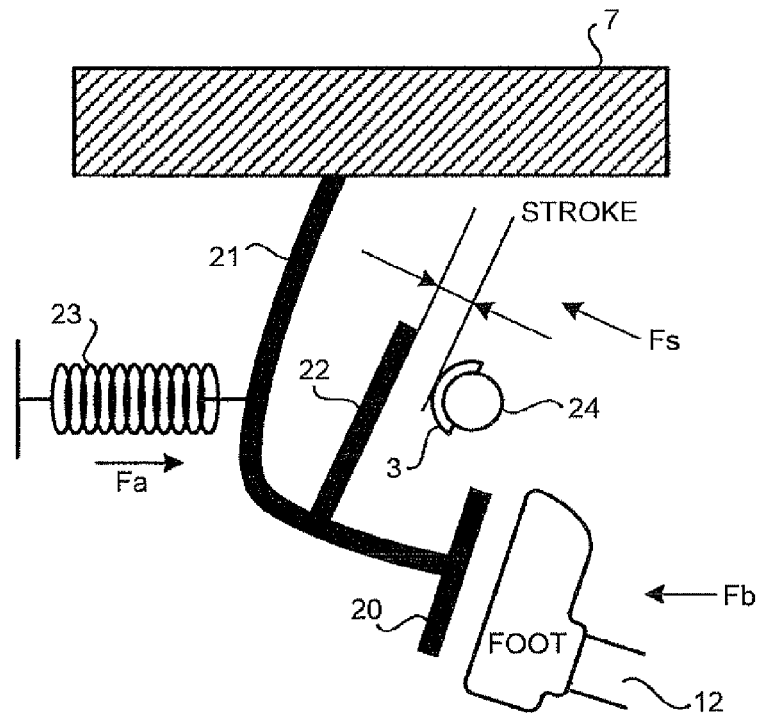
Figures 2, 13:
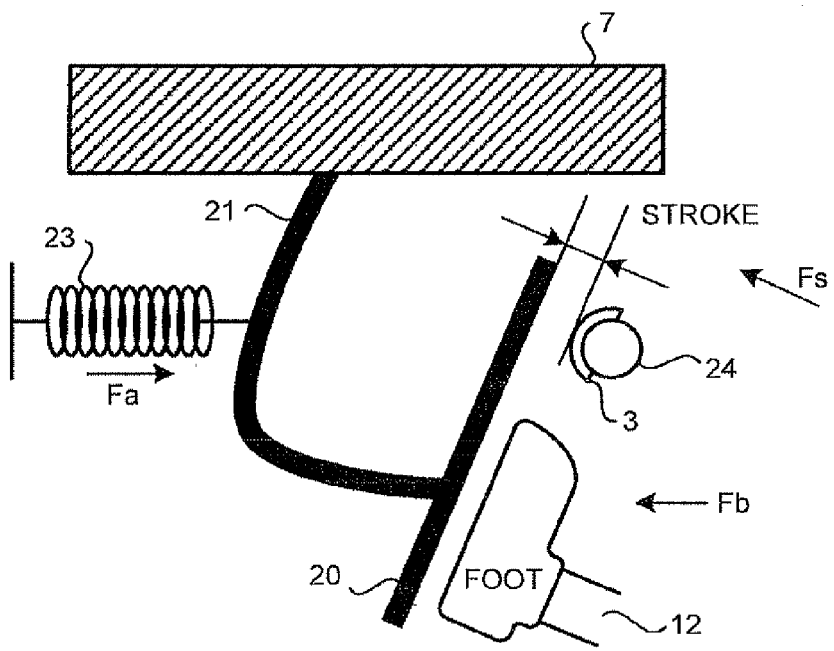
Figures 3, 13:
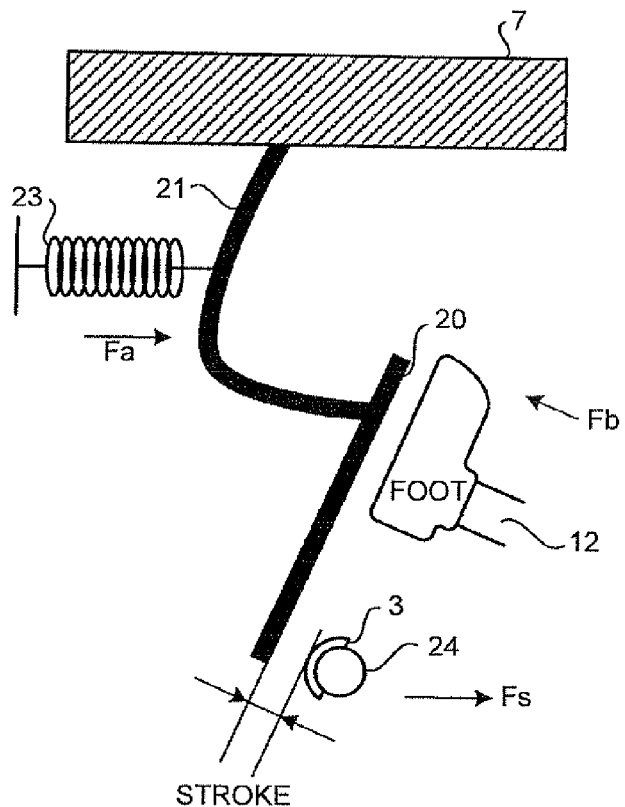
Figures 4, 13:
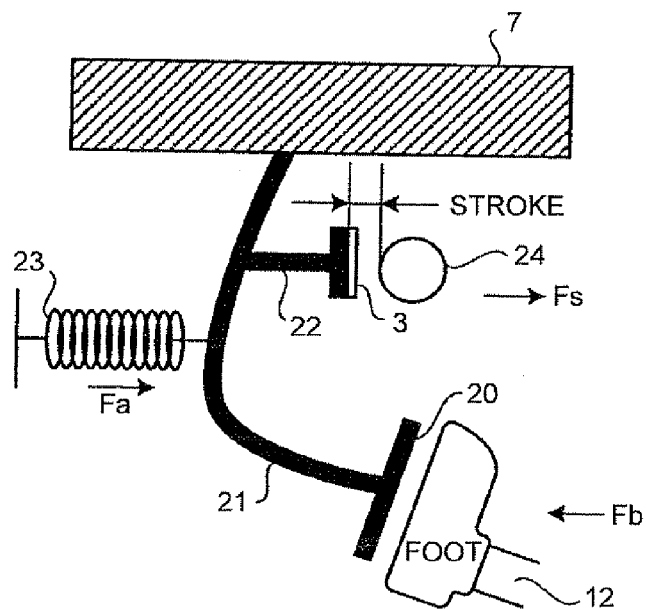

FIGS. 13-1 to 13-4 are schematic views illustrating a schematic configuration of an operating means 1 according to a fifth example. In FIGS. 13-1 to 13-4, components having the same functions as FIG. 5 are denoted by the same reference signs, and only different points will be explained.

FIG. 13-1 illustrates a configuration in which a bar 22, a stopper 24, and a load sensor 3 are disposed above an arm 21. FIG. 13-2 illustrates a configuration in which a pedal plate 20 also has a function of a press member for applying a load to the stopper 24, and the stopper 24 and the load sensor 3 are disposed above the arm 21. FIG. 13-3 illustrates a configuration in which the pedal plate 20 also has a function of a press member for applying a load to the stopper 24, and the stopper 24 and the load sensor 3 are disposed below the arm 21. FIG. 13-4 illustrates a configuration in which the bar 22 provided with the load sensor 3 and the stopper 24 are disposed above the arm 21.

INDUSTRIAL APPLICABILITY

As described above, the braking/driving force control device according to the present invention is useful when an accelerator operation and a brake operation are executed by an integral pedal.

REFERENCE SIGNS LIST

1 OPERATING MEANS
2 STROKE SENSOR (STROKE AMOUNT DETECTING MEANS)
3 LOAD SENSOR (LOAD DETECTING MEANS)
4 VEHICLE ECU 4 (CONTROL MEANS)
5 DRIVING FORCE GENERATING DEVICE
6 BRAKING FORCE GENERATING DEVICE
7 VEHICLE CHASSIS
10, 20 ACCELERATOR BRAKE PEDAL PLATE (PEDAL PLATE)
11 PEDAL FULCRUM
13 SPRING
21 ARM (MAIN SHAFT SECTION)
22 BAR (PRESS MEMBER)
23 SPRING (ELASTIC MEMBER)
24 STOPPER
51 ENGINE
52 TRANSMISSION
61 BRAKE

The invention claimed is:

1. A braking/driving force control device comprising:
an operating unit that is configured to be able to move forward and backward, moves in a forward direction by a depression operation, executes an acceleration operation and a deceleration operation by an integral pedal;
a stroke amount detecting unit that detects a stroke amount of the operating unit in response to an operation of the operating unit;
a load detecting unit that detects a load on a load receiving member in response to an operation of the operating unit;
a control unit that controls acceleration of a vehicle based on the stroke amount detected by the stroke amount detecting unit and further controls deceleration of a vehicle based on the load detected by the load detecting unit;
the load receiving member that receives the load by being abutted against a part of the operating unit at the time the stroke amount of the operating unit becomes equal to or less than a predetermined value; and
an urging unit that urges the operating unit in a backward direction opposite to the forward direction and applies a reaction force in response to the depression operation of the operating unit, wherein
the stroke amount detecting unit detects the stroke amount in the forward direction in response to the depression operation of the operating unit,
the load detecting unit detects the load in the backward direction received by the load receiving member, and
the control unit controls deceleration of the vehicle based on the load detected by the load detecting unit while the pedal is in a totally closed state, the totally closed state being a state in which the stroke amount of the operating unit is between zero and the predetermined value, inclusive.

2. The braking/driving force control device according to claim 1, wherein when the load receiving member receives the load by being abutted with a part of the operating unit, gradient characteristics of the load is set to a plurality of stages with respect to the stroke amount of the operating unit.

3. The braking/driving force control device according to claim 2, wherein
the load receiving member is configured to be movable and includes an urging unit that urges the load receiving member in a direction opposite to a direction where a part of the operating unit urges the load receiving member.

4. The braking/driving force control device according to claim 3, wherein the operating unit includes a pedal plate to which a driver applies a depression force and a pedal plate receiving section, and the pedal plate is coupled with the pedal plate receiving section by an elastic member.

5. The braking/driving force control device according to claim 2, wherein
the load receiving member includes an urging unit that urges the load receiving member in a direction opposite to a direction where a part of the operating unit urges the load receiving member; and
the operating unit includes a pedal plate to which a driver applies a depression force and a pedal plate receiving section, and the pedal plate is coupled with the pedal plate receiving section by an elastic member.

6. The braking/driving force control device according to claim 1, wherein
the load receiving member includes an urging unit that urges the load receiving member in a direction opposite to a direction where a part of the operating unit urges the load receiving member; and
the operating unit includes a pedal plate to which a driver applies a depression force and a pedal plate receiving section, and the pedal plate is coupled with the pedal plate receiving section by an elastic member.

* * * * *